Figure 1:
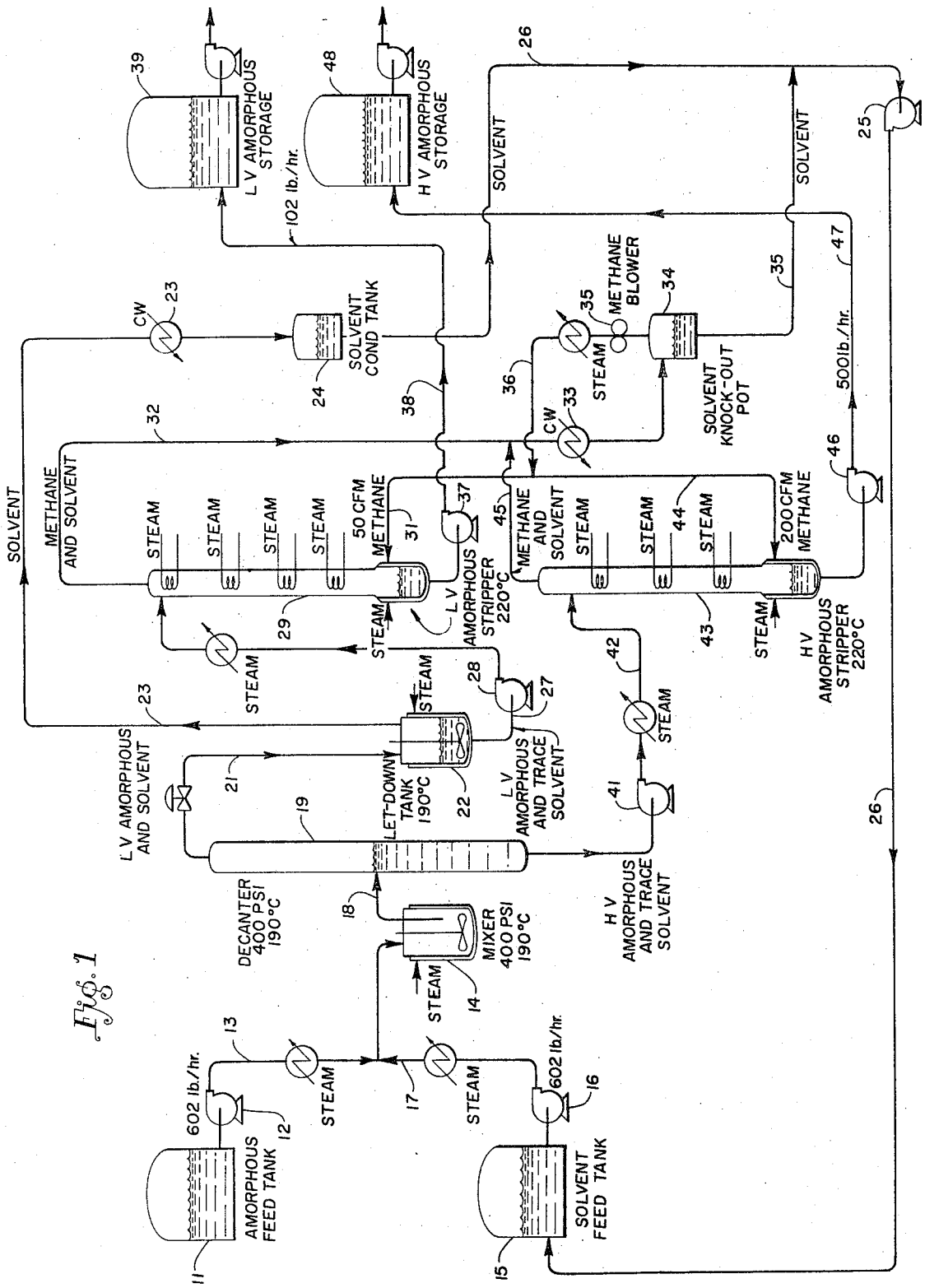

United States Patent [19]
Robinson et al.

[11] 3,855,193
[45] Dec. 17, 1974

[54] PROCESS FOR SEPARATING AMORPHOUS POLYOLEFINS INTO FRACTIONS HAVING DIFFERENT MELT VISCOSITIES

[75] Inventors: James S. Robinson; Paul D. Folzenlogen, both of Longview, Tex.

[73] Assignee: Eastman Kodak Company, Rochester, N.Y.

[22] Filed: Sept. 4, 1973

[21] Appl. No.: 394,032

[52] U.S. Cl......... 260/93.7, 260/88.25, 260/94.9 F, 260/94.9 GD, 260/878 B
[51] Int. Cl......... C08f 47/00, C08f 3/08, C08f 1/94
[58] Field of Search.... 260/94.9 F, 94.9 GD, 878 B, 260/93.7, 88.2 S

[56] References Cited
UNITED STATES PATENTS

| | | | |
|---|---|---|---|
| 2,845,410 | 7/1958 | De Vault et al. | 260/93.7 |
| 2,979,493 | 4/1961 | Axe et al. | 260/93.7 |
| 3,167,536 | 1/1965 | Zampachova et al. | 260/94.9 F |
| 3,600,463 | 8/1971 | Hagemeyer, Jr. et al. | 260/94.9 F |
| 3,679,775 | 7/1972 | Hagemeyer, Jr. et al. | 260/878 B |

OTHER PUBLICATIONS

Chemical Abstracts, 55 : 11911f, (1961).
Die Makromolekulare Chemie, 36, 115–132, (1960).
Die Makromolekulare Chemie, 94, 143–152, (1966).

*Primary Examiner*—Joseph L. Schofer
*Assistant Examiner*—A. Holler

[57] ABSTRACT

Process for separating hexane soluble polyolefins into fractions having different viscosities. The separation is made by mixing the hexane soluble polyolefin with a particular solvent or mixture of solvents at a temperature sufficient to form more than one separate layer containing amorphous polyolefins. Thereafter, the separate layers are isolated and amorphous polyolefin fractions recovered therefrom.

8 Claims, 1 Drawing Figure

PROCESS FOR SEPARATING AMORPHOUS POLYOLEFINS INTO FRACTIONS HAVING DIFFERENT MELT VISCOSITIES

This invention relates to a novel process for separating amorphous polymers into high and low melt viscosity fractions. In one specific aspect, the invention relates to a process for separating amorphous polyolefins, i.e., hexane soluble polyolefins, into high and low melt viscosity fractions.

The amorphous polymers with which the present invention is concerned are normally obtained as a coproduct in the production of crystalline polymers with stereospecific catalysts. The melt viscosity of the amorphous polymer produced is dependent on the molecular weight of the crystalline polymer that is being produced. Consequently, when lower molecular weight crystalline polymers are produced the amorphous polymer has a low melt viscosity. For example, when crystalline polypropylene is produced in a molecular weight range that is desirable for many commercial applications such as film and extrusion coating, the melt viscosity of the amorphous polypropylene produced is too low to be useful in applications such as hot melt adhesives. Prior to the present invention, various process modifications such as changes in catalyst mole ratios and variations in temperatures were tried in an attempt to increase the melt viscosity of the amorphous material. Also, extraction of the crude polymer with other solvents such as mineral spirits at temperatures higher than the boiling point of hexane. These process modifications, however, did not increase the melt viscosity of the amorphous polymer.

Therefore, a process for either increasing the melt viscosity of the amorphous polymer for a given molecular weight crystalline polymer being produced or to separate the amorphous polymer into higher melt viscosity fractions would be an advance in the state of the art.

In accordance with the present invention, a process is provided whereby amorphous polypropylene could be separated into fractions having different melt viscosities by extraction under liquid-liquid conditions with low molecular weight alcohols or acetone. These solvents were found to selectively extract the lower melt viscosity fractions from the amorphous polypropylene and permit control of the melt viscosity obtained by varying the solvent to amorphous ratio. Only the $C_1$ to $C_3$ alcohols or acetone was effective at temperatures high enough — 150°C. or above under the vapor pressure of the solvent — to permit efficient handling of the polymer. Higher molecular weight alcohols or ketones completely dissolve the amorphous polypropylene at these conditions.

The amorphous polymers which can be separated or fractionated by the process of the present invention are the normally solid hexane soluble polymers. These polymers are obtained by the polymerization of propylene or mixtures of propylene and a different alpha-monoolefin in the presence of stereospecific catalysts. Also, these polymers are obtained by the alternate polymerization of propylene and a different alpha-monoolefin in the presence of stereospecific catalysts or by the alternate polymerization of propylene and a mixture of propylene and a different alpha-monoolefin in the presence of stereospecific catalysts. The amorphous polymers are normally obtained as a coproduct in the preparation of crystalline polypropylene and crystalline propylene-alpha-monoolefinic copolymers by stereospecific catalysis. For example, when propylene is polymerized in the presence of stereospecific catalysts, a crude or gross polymer is obtained which is a mixture of hexane insoluble polymer and hexane soluble polymer. The crude polymer is then extracted with hexane to obtain a hexane soluble amorphous polypropylene fraction and a hexane insoluble crystalline polypropylene fraction. The hexane soluble polymers are those with which the present invention is primarily concerned; however, these hexane soluble polymers may also contain minor amounts, up to 10 weight percent, of the hexane insoluble crystalline polymer.

The present invention is particularly useful for fractionating amorphous polymers prepared by high temperature solution polymerization processes. One such polymerization process disclosed in U.S. Pat. No. 3,679,775 comprises polymerizing propylene in a diluent such as mineral spirits in the presence of lithium containing stereospecific catalysts at temperatures of 140° to 250°C. For example, polypropylene can be prepared by adding propylene, mineral spirits, and a catalyst prepared from lithium butyl, aluminum triethyl, and titanium trichloride at a mole ratio of Li/Al/Ti of 0.5/0.25/1 to a reactor operated at a temperature of 165°C. and a pressure of 1000 psig. The polymer solution from the reactor together with unreacted propylene and catalyst residues passes into a let-down tank where unreacted propylene is vented and additional solvent is added to dilute the polymer solution. The diluted polymer solution at a temperature of about 220°C. is filtered and passed through an alumina bed to remove the catalyst residues. The polymer solution is then passed into a concentrator where the major portion of mineral spirits is removed by stripping with an inert gas. From the concentrator the crude polymer containing about 15 weight percent mineral spirits passes through an extruder and is pelletized. The crude polymer pellets are then extracted with boiling hexane to remove the hexane soluble amorphous polypropylene. The amorphous polypropylene in solution then passes into a stripper where the solvent is removed by stripping with an inert gas. This amorphous polypropylene can then be separated into fractions of various melt viscosities by the process of this invention.

Separation of the amorphous polyolefin into fractions having different melt viscosities is advantageous since a desired product can be made for a specific end use application. For example, the higher melt viscosity amorphous products provide improved delamination resistance when used as a hot melt adhesive for paper-to-paper lamination. They also provide a desirable base product in combination with other polymers and resins for hot melt adhesives. The lower melt viscosity products are useful as a component in coaxial cable fillers to improve adhesion and water proofing characteristics. Other uses include, for example, applications such as hot melt dip coatings for meat and as a component in candle making. The separation process of the present invention is essentially a liquid-liquid extraction which comprises contacting the amorphous polymer with a solvent or mixture of solvents selected from the group consisting of acetone and alcohols containing one to three carbon atoms at a temperature such that a two-phase mixture is formed. The two-phase mixture is separated and thereafter the solvent is removed from each phase to obtain amorphous polymers having different melt viscosities from that of the initial amorphous polymer.

In some instances it is desirable to add water to the solvent or mixture of solvents used in the process as an aid in phase separation. The addition of water also provides more flexibility in varying the solution characteristics of the system. The amount of water used wil depend on various factors such as the particular solvent, temperatures used and the results desired. However, it has been found that about 0.2 to 5 weight percent water, based on the weight of the solvent, is usually adequate.

The process can be operated either batchwise or continuous. A simplified flow diagram with the process conditions of a typical continuous process is shown in FIG. 1.

Amorphous polypropylene from feed tank 11 is fed by pump 12 through line 13 to mixer 14. The amorphous polypropylene is heated by steam to remain in a molten condition through the process. Solvent from feed tank 15 is fed by pump 16 through line 17 to mixer 14. Amorphous polypropylene and solvent are each fed to mixer 14 at the rate of 602 pounds per hour. Mixer 14 is operated at a pressure of 400 psi and a temperature of 190°C. The two-phase mixture from mixer 14 passes through line 18 into decanter 19 where the two phases are separated. The upper or lighter phase which contains a low melt viscosity amorphous fraction and solvent is removed from the top of decanter 19 by line 21 to let-down tank 22. The let-down tank is operated at approximately atmospheric pressure and a temperature of 190°C. Substantially all the solvent boils off in let-down tank 22 and is removed by line 23 and condensed with cold water in condenser 23 and passes into solvent condensing tank 24. The solvent can then be recycled to solvent feed tank 15 by pump 25 through line 26. The low viscosity amorphous polymer containing a trace amount of solvent is fed by line 27 and pump 28 to the top of stripper 29. Heated methane is added to stripper 29 at about 50 cubic feet per minute through line 31. The heated methane sweeps the residual solvent from the low viscosity amorphous polymer. The hot methane and residual solvent are removed from stripper 29 through line 32. The solvent is condensed by condenser 33 and the liquid solvent is separated from methane in solvent knock-out pot 34. Solvent is recycled by line 35 and pump 25 to solvent feed tank 15. Methane is recycled to methane blower 35 reheated and recycled for solvent stripping through line 36. Low viscosity amorphous polypropylene is removed from the lower portion of stripper 29 by pump 37 through line 38 to low viscosity amorphous storage tank 39 at the rate of 102 pounds per hour.

High viscosity amorphous polypropylene and trace solvent is removed from the lower portion of decanter 19 by pump 41 through line 42 to the upper position of high viscosity amorphous stripper 43. A heated stream of methane from line 44 passes through the high viscosity amorphous polypropylene and trace solvent as it passes through stripper 43.

The methane and trace solvent is removed from the top of stripper 43 by line 45 and solvent condensed by condenser 33. The solvent and methane are separated in solvent knock-out pot 34. Solvent is recycled to solvent feed tank 15 by pump 25 and lines 35 and 26. High viscosity amorphous polypropylene is removed from the lower portion of stripper 43 by pump 46 and line 47 to high viscosity amorphous storage tank 48.

The temperature of the liquid-liquid extraction can vary over a wide range and the particular temperature used depends on such factors as the melt viscosity of the amorphous, the solvents used, and the solvent to amorphous ratio. The temperature is not critical except that it must be such that a two phase mixture is formed. From a practical standpoint we have found that a satisfactory temperature range is about 150° to 250°C. and preferably about 165° to 200°C. At temperatures below 150°C. the mixture becomes too viscous to handle efficiently and at temperatures above 250°C. two phases may not form and thermal degradation of the polymer may occur. The liquid-liquid extraction operates under the vapor pressure of the solvent used and generally ranges from 100 to 1000 psig. The contact time can vary over a wide range and will depend on such factors as the efficiency of mixing, the type amorphous polymer used, the solvents used, the temperature, and the solvent to amorphous ratio. We have found that contact times of about 5 minutes to 2 hours, preferably 15 minutes to 1 hour, are satisfactory. The residual solvent can be removed from the fractions by stripping with an inert gas such as methane or nitrogen at a temperature of about 150 to 220°C.

In the process of this invention two amorphous fractions are obtained, one having a higher melt viscosity and one having a lower melt viscosity than the starting material. The melt viscosity of these fractions can be controlled by varying the solvent to amorphous ratio, the solvent used, and the temperature. However, for a given temperature and solvent the solvent to amorphous ratio is the variable used to control the melt viscosity of the fractions. As the solvent to amorphous ratio (weight basis) increases the melt viscosity of the fractions increases. For example, when isopropanol is used as the solvent at a temperature of 175°C. to fractionate amorphous polypropylene having an initial melt viscosity of 2830 centipoise at 190°C., the viscosity of the higher viscosity fraction increases from 3000 centipoise to 14,300 centipoise as the solvent to amorphous ratio based on weight is increased from 1.5/1 to 10/1. The viscosity of the lower viscosity fraction increases somewhat with increasing solvent to amorphous ratios up to ratios of about 3/1. Above this level the viscosity is essentially constant. However, this relationship may vary depending on the composition of the initial amorphous material and the particular solvents used. It has been found that solvent to amorphous ratios of at least 1/1 are necessary in order to obtain fractionation by the process of this invention. The particular ratio used will depend on the viscosity desired in the fractions; however, we have found that ratios of 1/1 to 20/1 are satisfactory and that the preferred range is 1.5/1 to 10/1.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

Fractionation of Amorphous Polypropylene With Isopropanol

The amorphous polypropylene used in these examples was obtained as a coproduct from gross polypropylene made by polymerizing propylene in the following process.

A catalyst prepared from lithium butyl, triethyl aluminum and titanium trichloride is prepared according to Example 1 of U.S. Pat. No. 3,679,775. The catalyst contains lithium butyl, triethyl aluminum and titanium trichloride in a mole ratio of 1/2:1/2:1. The titanium trichloride has an average particle size of 10 microns. The catalyst mixture is charged to a dry 2-liter stirred stainless steel autoclave with 850 ml. of mineral spirits. The autoclave is sealed, purged with propylene and heated to 160°C. Propylene is pumped into the autoclave to 1000 psi and the reaction continued for 3 hours. The autoclave is cooled and vented. The gross polypropylene recovered from the reaction has a hexane index of 70.5 percent (percent normal-extractable with normal hexane at reflux) and an inherent viscosity of 1.66 (determined in tetralin at 145°C.). The solid polypropylene extracted with normal hexane at reflux is amorphous polypropylene and has the following properties:

| | |
|---|---|
| Viscosity at 190°C., cp. | = 2830 |
| Ring and Ball Softening Point, °C. | = 106 |

A series of experiments were made to determine the effect of isopropanol to amorphous polypropylene ratio at 175°C. on the melt viscosity of the high and low melt viscosity fractions. These experiments were carried out in a 2-liter stainless steel stirred Parr autoclave fitted with a stirrer, thermowell, and dip pipe. The amorphous polypropylene and solvent were added to the autoclave and the autoclave sealed and purged with nitrogen. The autoclave was heated to 175°C. and stirring begun. After 1 hour of stirring, the agitator was stopped and the two phases allowed to separate for 10 minutes.

The lower phase, which contained the high viscosity fraction, was extruded through the dip pipe into a clean, tared 2-liter glass resin flask. The upper phase, which contained the low viscosity fraction and solvent, was allowed to cool in the autoclave.

The two fractions were then stripped of residual solvent with nitrogen at 180°C. for 1 hour. The flasks were weighed and the weight of each fraction determined. Viscosity at 190°C. and ring and ball softening point were measured.

Experiments were made at solvent to amorphous ratios of 2/1 to 10/1. Details are shown in Table I. It can be seen that the melt viscosity can be controlled by varying the solvent to amorphous ratio. As the ratio goes up so does the melt viscosity of the high viscosity fraction. The viscosity of the low viscosity fraction increases up to ratios of about 3/1 and is then essentially constant. The ring and ball softening points for both fractions and the starting amorphous polypropylene range from 103° to 107°C. The yield of the high viscosity amorphous fraction increases as the solvent to amorphous ratio is decreased.

EXAMPLE 2

Fractionation of Amorphous Polypropylene With Isobutanol and Methyl Ethyl Ketone The same amorphous polypropylene and procedure described in Example 1 were used. Isobutanol and methyl ethyl ketone were evaluated as solvents. Only one phase was present in the autoclave and no separation of the amorphous polypropylene occurred. Similar results were obtained at temperatures of 130° and 160°C. with isobutanol.

EXAMPLE 3

Fractionation of Amorphous Polypropylene With Solvent Mixtures — 18 Percent Ethanol, 82 Percent Isopropanol Amorphous polypropylenes of two different viscosities, i.e., 1330 centipoise and 2830 centipoise at 190°C., were used in these experiments. The procedure was the same as described in Example 1 except that the solvent used was a mixture of 18 percent ethanol and 82 percent isopropanol and the temperature was 190°C. Details are given in Table II.

The viscosity of the higher viscosity fraction can be controlled by the solvent to amorphous ratio. Fractionation of a lower viscosity amorphous polypropylene, i.e., 1330 centipoise, results in the separation into a high and low viscosity product also. The lower viscosity fraction is similar to that obtained from the 2830 centipoise amorphous polypropylene, i.e., 360 centipoise at 190°C.

Adhesive properties were measured on samples of the high and low viscosity fractions. These data are shown in Table III.

EXAMPLE 4

Fractionation of Amorphous Polypropylene With Solvent Mixture — Methanol and Isopropanol The solvent system methanol/isopropanol was evaluated for fractionating amorphous polypropylene. The procedure and amorphous polypropylene as described in Example 1 were used. Results are shown in Table IV. At a fixed solvent to amorphous ratio the viscosity of the amorphous polypropylene can be controlled by varying the methanol/isopropanol composition. By increasing the methanol content from 5 to 18 percent, the viscosity of the high viscosity fraction is decreased.

EXAMPLE 5

Fractionation of Amorphous Polypropylene With Acetone

The procedure and amorphous polypropylene as described in Example 1 were used except acetone was used as the solvent. Results are shown in Table V.

EXAMPLE 6

Fractionation of Amorphous Polypropylene With Isopropanol/Water

The same amorphous polypropylene and procedure described in Example 1 were used. This example shows the effect of the addition of water to isopropanol on fractionating amorphous polypropylene. Details are given to Table VI.

TEST METHODS 1. 73° Peel Strength

This test method provides a means of measuring the strength of a hot melt adhesive when subjected to increasing stress.

The adhesive is applied to 30-pound Kraft paper (unglazed side up) onto a ¼-inch wide strip exposed between two pieces of bond paper (20-pound). A spatula blade is pulled uniformly across the adhesive.

The Kraft paper is cut into 1-inch wide strips so that a test specimen 1-inch wide by 4-inches long with one-fourth inch across one end is obtained. Another setup of Kraft paper the same size is sealed to the piece with adhesive using a Sentinel Heat Sealer Model 12ASL at a temperature of 250°F. and 25 psi. pressure for 0.2 second.

The tensile strength is measured using an Instron tensile tester at a speed of 0.1 inch per minute.

2. 2-Inch Pop-Open, °F.

The pop-oven tests provide a relative measure of the ability of an adhesive to resist bond failure when used in the construction of containers where the bonds are subjected to shearing forces at elevated temperatures.

Test specimens are prepared by cutting 2 inch wide by 9 inch long strips from 21 point chip board (9 inch length cut from machine direction of roll). Four strips are made. The specimen length is adjusted so that the ends overlap by one-half inch when wrapped around a 250-ml beaker.

The test specimens are placed in a cool oven. The oven is turned on and the test specimen is observed as the temperature rises. The temperature at which the bond fails is the 2 inch pop-open.

3. Delamination Resistance

This test method provides a means of measuring the resistance of an adhesive to delaminate under a fixed load.

The adhesive is applied at a thickness of 10 mils between two pieces of 30-pound Kraft paper. Specimens ½ by 4 inches are cut from the bonded Kraft paper. One inch is peeled back by heating. After aging 15 minutes at 120°F., one end of the T specimen is attached to the top of the oven and to the other end a 50 gram weight is attached. The time to failure of the bond is the delamination resistance.

Table I

Fractionation of Amorphous Polypropylene*
With Isopropanol

| Run No. | Solvent | Solvent to Amorphous Polypropylene Ratio | Temp. °C. | Press. psig. | High Viscosity Fraction | | | Low Viscosity Fraction | | |
|---|---|---|---|---|---|---|---|---|---|---|
| | | | | | Wt.% | Visc. at 190°C. cp. | R&B Soft. Pt. °C. | Wt.% | Visc. at 190°C. cp. | R&B Soft. Pt. °C. |
| 1 | Isopropanol | 2/1 | 175 | 140 | 87 | 4,350 | 107 | 13 | 180 | 103 |
| 2 | Isopropanol | 2.5/1 | 175 | 150 | 74 | 5,680 | 107 | 26 | 145 | 105 |
| 3 | Isopropanol | 3/1 | 175 | 160 | 61.0 | 7,780 | 107 | 39.0 | 615 | 106 |
| 4 | Isopropanol | 3.3/1 | 175 | 160 | 66 | 7,720 | 107 | 35 | 375 | 104 |
| 5 | Isopropanol | 4/1 | 175 | 165 | 62 | 8,700 | 108 | 38 | 375 | 104 |
| 6 | Isopropanol | 10/1 | 175 | 180 | 47 | 14,300 | 108 | 53 | 410 | 105 |

*Viscosity at 190°C = 2,830 cp
Ring and Ball Softening Point = 106°C

Table II

Fractionation of Amorphous Polypropylene
With 18 Percent Ethanol — 82 Percent Isopropanol

| Run No. | Solvent to Amorphous Polypropylene Ratio | Temp. °C. | Press. psig. | Amorphous Polypropylene Feed | | High Viscosity Fraction | | | Low Viscosity Fraction | | |
|---|---|---|---|---|---|---|---|---|---|---|---|
| | | | | Visc. at 190°C. cp. | R&B Soft. Pt. °C. | Wt. % | Visc. at 190°C. cp. | R&B Soft. Pt. °C. | Wt. % | Visc. at 190°C. cp. | R&B Soft. Pt. °C. |
| 1 | 2/1 | 190 | 200 | 2,830 | 106 | 87 | 4,200 | 106 | 13 | 170 | 104 |
| 2 | 3/1 | 190 | 190 | 2,830 | 106 | 72 | 6,800 | 108 | 28 | 190 | 105 |
| 3 | 5/1 | 190 | 200 | 2,820 | 106 | 62 | 11,300 | 107 | 38 | 190 | 103 |
| 4 | 3/1 | 190 | 200 | 1,330 | 98 | 54 | 5,200 | 104 | 46 | 300 | 98 |

Table III

Adhesive Properties of Amorphous Polypropylene Extracted
With 18 Percent Ethanol — 82 Percent Isopropanol

| | High Viscosity Fraction | | | Control Starting Material | Low Viscosity Fraction | |
|---|---|---|---|---|---|---|
| Amorphous Polypropylene Viscosity at 190°C., cp. | 11,900 | 6,800 | 5,200 | 2,830 | 360 | 275 |
| Adhesive Properties | | | | | | |
| 73°F Peel Strength, g | 495 | 470 | 482 | 333 | 173 | 230 |
| 2-Inch Pop-Oven, °F. | 220 | 215 | 207 | Failed at room temp. | Failed at room temp. | Failed at room temp. |
| Delamination Resistance at 120°F., minutes to failure | >60 | >60 | >60 | 16 | 0.5 | 0.25 |

Table IV

Fractionation of Amorphous Polypropylene
With Methanol — Isopropanol

| Run No. | Solvent System | Solvent to Amorphous Polypropylene Ratio | Temp. °C. | Press. psig. | High Viscosity Fraction | | | Low Viscosity Fraction | | |
|---|---|---|---|---|---|---|---|---|---|---|
| | | | | | Wt. % | Visc. at 190°C. cp. | R&B Soft. Pt. °C. | Wt. % | Visc. at 190°C. cp. | R&B Soft. Pt. °C. |
| 1 | 5% Methanol/ 95% Isopropanol | 3/1 | 190 | 210 | 67 | 7,680 | 106 | 33 | 305 | 104 |
| 2 | 18% Methanol/ 82% Isopropanol | 3/1 | 190 | 250 | 81 | 4,530 | 108 | 19 | 275 | 102 |

Table V

Fractionation of Amorphous Polypropylene
With Acetone

| Solvent System | Solvent to Amorphous Polypropylene Ratio | Temp. °C. | Press. psig. | High Viscosity Fraction | | | Low Viscosity Fraction | | |
|---|---|---|---|---|---|---|---|---|---|
| | | | | Wt. % | Visc. at 190°C. cp. | R&B Soft. Pt. °C. | Wt. % | Visc. at 190°C. cp. | R&B Soft. Pt. °C. |
| Acetone | 3/1 | 190 | 250 | 76 | 4,850 | 108 | 24 | 480 | 103 |

Table VI

Effect of Water in Isopropanol on Fractionation
of Amorphous Polypropylene

| Run No. | Solvent | % Water | Solvent to Amorphous Polypropylene Ratio | Temp. °C. | Press. psig. | Alcohol Insoluble Fraction | | Alcohol Soluble Fraction | |
|---|---|---|---|---|---|---|---|---|---|
| | | | | | | Wt.% | Visc. at 190°C. cp. | Wt.% | Visc. at 190°C. cp. |
| 1 | Isopropanol | 1.0 | 3/1 | 175 | 200 | 64.5 | 8,540 | 35.5 | 320 |
| 2 | Isopropanol | 1.8 | 3/1 | 175 | 200 | 55.5 | 9,180 | 44.5 | 550 |
| 3 | Isopropanol | 2.0 | 3/1 | 175 | 220 | 65.5 | 8,270 | 34.5 | 310 |
| 4 | Isopropanol | 5.0 | 3/1 | 175 | 220 | 71.0 | 6,600 | 29 | 325 |

The invention has been described in detail with particular reference to certain preferred embodiments thereof, but it will be understood that variations and modifications can be effected within the spirit and scope of the invention.

We claim:

1. A process for separating amorphous olefin polymer into at least two fractions having different melt viscosities which comprises mixing said amorphous polymer at a temperature of 150° to 250°C. with solvent selected from acetone, methanol, ethanol, propanol, isopropanol or mixtures thereof at a pressure of at least the vapor pressure of acetone at the mixing temperature to form at least two separate layers, separating said separate layers and recovering the amorphous polymer contained in said layers to obtain amorphous polymer fractions having different melt viscosities than that of said amorphous polymer.

2. A process according to claim 1 wherein the amount of solvent to amorphous polymer, based on weight, is a ratio of 1.5/1 to 10/1.

3. A process according to claim 2 wherein the solvent is isopropanol.

4. A process according to claim 2 wherein the solvent is acetone.

5. A process according to claim 2 wherein the solvent is a blend of isopropanol and methanol.

6. A process according to claim 2 wherein the solvent is a blend of isopropanol and ethanol.

7. A process for separating amorphous olefin polymer according to claim 2 wherein said solvent contains 0.2 to 5 weight percent water based on the weight of solvent used in the process.

8. A process according to claim 3 wherein said solvent contains about 0.2 to about 5 weight percent water based on the weight of isopropanol used as solvent.

* * * * *